(12) United States Patent
Gomes

(10) Patent No.: US 10,676,073 B2
(45) Date of Patent: *Jun. 9, 2020

(54) MULTIPLE-STAGE COLLISION AVOIDANCE BRAKING SYSTEM AND METHOD

(71) Applicant: Arnaldo C. Gomes, Warren, NJ (US)

(72) Inventor: Arnaldo C. Gomes, Warren, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/188,175

(22) Filed: Nov. 12, 2018

(65) Prior Publication Data

US 2019/0077384 A1 Mar. 14, 2019

Related U.S. Application Data

(63) Continuation of application No. 15/439,261, filed on Feb. 22, 2017, now Pat. No. 10,124,777.

(51) Int. Cl.
| | |
|---|---|
| *B60T 8/36* | (2006.01) |
| *B60T 7/22* | (2006.01) |
| *B60T 8/26* | (2006.01) |
| *B60T 13/26* | (2006.01) |
| *B60T 13/68* | (2006.01) |
| *B60T 13/66* | (2006.01) |
| *B60T 17/22* | (2006.01) |

(52) U.S. Cl.
CPC ............. *B60T 7/22* (2013.01); *B60T 8/263* (2013.01); *B60T 8/266* (2013.01); *B60T 13/268* (2013.01); *B60T 13/662* (2013.01); *B60T 13/683* (2013.01); *B60T 17/22* (2013.01); *B60T 2201/022* (2013.01)

(58) Field of Classification Search
CPC ... B60T 7/22; B60T 8/26; B60T 8/263; B60T 8/266; B60T 8/268
See application file for complete search history.

(56) References Cited

U.S. PATENT DOCUMENTS

| | | |
|---|---|---|
| 2,062,500 A | 12/1936 | Casler et al. |
| 3,903,919 A | 9/1975 | Zeuner |
| 4,118,076 A | 10/1978 | Mild |
| 4,146,107 A | 3/1979 | Ebbeson et al. |
| 4,261,624 A | 4/1981 | Plantan |
| 4,455,052 A | 6/1984 | Bueler |
| 4,556,259 A | 12/1985 | Feldmann et al. |
| 4,776,648 A | 10/1988 | Newton et al. |
| 4,973,107 A | 11/1990 | Graham |
| 5,458,402 A | 10/1995 | Jeffery |

(Continued)

*Primary Examiner* — Bradley T King
(74) *Attorney, Agent, or Firm* — Roberts & Roberts, LLP; Richard S. Roberts, Jr.

(57) ABSTRACT

An apparatus and method for automatic actuation and control of an air braking system on a commercial vehicle, under a warning of collision conditions, having multiple stages of operation, which supplements the normal brake pedal activation and control of the air brake operation under the driver's foot control. A modification to a standard air brake system structure enables the addition of the automatic activation and control stages. When an impending collision signal is received, an activation component operates valves to pressurize the rear brakes followed by pressurizing the front brakes, if necessary. The driver can deactivate the automatic braking functions by stepping on the brake pedal or by operating the vehicle turn signals.

17 Claims, 3 Drawing Sheets

(56) References Cited

U.S. PATENT DOCUMENTS

| | | | |
|---|---|---|---|
| 5,931,547 A | 8/1999 | Lerner | |
| 6,056,374 A | 5/2000 | Hiwatashi | |
| 6,183,052 B1 | 2/2001 | Harada et al. | |
| 6,272,904 B1 | 8/2001 | Neely, Jr. et al. | |
| 6,342,832 B1 | 1/2002 | Fuchs et al. | |
| 6,523,912 B1 | 2/2003 | Bond, III et al. | |
| 6,984,005 B2 | 1/2006 | Meyer et al. | |
| 7,018,004 B2 | 3/2006 | Chen et al. | |
| 7,103,464 B2 | 9/2006 | Zielke | |
| 7,209,050 B2 | 4/2007 | Corcoran, III | |
| 8,631,913 B2 | 1/2014 | Besler | |
| 8,702,179 B2 | 4/2014 | Beier et al. | |
| 8,739,938 B2 | 6/2014 | King et al. | |
| 8,794,715 B2 | 8/2014 | Bennett et al. | |
| 8,823,504 B2 | 9/2014 | Custer et al. | |
| 8,833,868 B2 | 9/2014 | Bensch et al. | |
| 8,851,580 B2 | 10/2014 | Herbst | |
| 8,979,217 B2 | 3/2015 | Steinberger et al. | |
| 8,991,536 B2 | 3/2015 | Dieckmann et al. | |
| 9,428,163 B2 | 8/2016 | Breuer et al. | |
| 9,511,741 B1 | 12/2016 | Wu | |
| 9,771,055 B1 | 9/2017 | Zhang et al. | |
| 10,131,336 B2 * | 11/2018 | Niglas | B60T 15/027 |
| 2003/0043033 A1 | 3/2003 | Lee | |
| 2003/0205928 A1 | 11/2003 | Harris et al. | |
| 2004/0019426 A1 | 1/2004 | Knoop et al. | |
| 2004/0193351 A1 | 9/2004 | Takahashi et al. | |
| 2005/0168064 A1 | 8/2005 | McCann | |
| 2008/0234907 A1 | 9/2008 | Labuhn et al. | |
| 2009/0018740 A1 | 1/2009 | Noda et al. | |
| 2009/0224944 A1 | 9/2009 | Wan | |
| 2010/0056338 A1 | 3/2010 | Erban | |
| 2013/0320751 A1 | 12/2013 | Eberling et al. | |
| 2015/0210280 A1 | 7/2015 | Agnew et al. | |
| 2015/0360655 A1 | 12/2015 | Odate et al. | |
| 2016/0137177 A1 | 5/2016 | Ulf et al. | |
| 2016/0311413 A1 | 10/2016 | Odate | |
| 2017/0267222 A1 | 9/2017 | Antunes | |
| 2017/0267234 A1 | 9/2017 | Kemp et al. | |
| 2018/0236984 A1 * | 8/2018 | Gomes | B60T 7/22 |
| 2018/0354475 A1 * | 12/2018 | Carritte | B60T 7/22 |
| 2018/0354483 A1 * | 12/2018 | Hanslik | B60T 7/042 |
| 2019/0071083 A1 * | 3/2019 | Takahashi | B60W 30/143 |

* cited by examiner

MULTIPLE-STAGE COLLISION AVOIDANCE BRAKING SYSTEM AND METHOD

CROSS-REFERENCE TO RELATED APPLICATION

This application is a Continuation of U.S. application Ser. No. 15/439,261, filed Feb. 22, 2017, now U.S. Pat. No. 10,124,777 which issued on Nov. 13, 2018, the disclosure of which is incorporated by reference herein in its entirety.

BACKGROUND OF THE INVENTION

Various types of apparatus have been introduced into the marketplace to provide collision avoidance operation of motor vehicles, principally for collision avoidance of automobiles and light trucks. Most of these systems have been specifically designed for automobiles and light trucks which use hydraulic brake systems. In a hydraulic brake system, brake fluid is used to transmit a hydraulic pressure from the driver's pedal to the foundation brakes, with or without vacuum assistance to increase the pressure. Braking force is dependent to a large measure upon the pressure developed by pressing the brake pedal.

Included in such collision avoidance apparatus are object detection and ranging systems using radar, laser, or optical camera ranging technology to trigger an alarm to the driver, or to adjust the setting of automatic cruise control, or to activate an automated braking system structure.

These systems serve to reduce or eliminate the effect of human reaction time in the presence of a collision threat. They are generally intended for OEM, factory installation.

Present day collision alarm and avoidance systems usually take the form of a warning system or a supplemental brake control system which is microprocessor driven. Some of these systems prematurely control brake light illumination of a proceeding vehicle, as a distance closure warning to a following vehicle, before the brake pedal of the preceding vehicle is operated. Other systems calculate collision mitigation based upon radar, yaw rate, wheel speed, and rear view camera inputs to control power brake booster performance to adjust braking force in a hydraulic system. Many of these systems have electronic controllers which calculate velocity profiles, collision probabilities and provide supplemental brake system instructions.

Braking systems for heavy commercial highway vehicles, such as tractor trailers, heavy straight trucks, and buses, depart from the hydraulic automobile and light truck braking systems, as they are almost exclusively air brake systems. Air brakes can develop a greater stopping force, use simpler components, remain operable even in the presence of a leak, and are generally more safe than hydraulic brakes. Air brakes are found on commercial vehicles with a maximum gross vehicle weight rating (GVWR) of 33,000 pounds or more. They are also often found on vehicles with lesser GVWR, such as 20,000 pounds.

Commercial vehicle air brake systems operate with air pressure from air reservoirs containing a volume of high pressure air, ranging from 60 psi to 120 psi (maximum allowed by D.O.T.), depending upon the design of the braking system. Typically, air reservoirs used in air brake systems are under a pressure of 60-120 psi. There generally is a front circuit to operate the front brakes and a rear circuit to operate the rear brakes. Each circuit has its own air reservoir.

Fail safe air brake systems provide a lesser pressure to service (work) brakes from a second air reservoir in the presence of a failure in the primary service brake circuit. Other systems utilize a lower pressure circuit to control the relay valves of a higher pressure service brake circuit.

Factory available adaptive cruise control systems can electronically set a braking pressure in an air brake system above the default braking pressure, as software resident in the system senses and calculates vehicle factors including speed, yaw rate, lateral acceleration steering angle and traction in regards to predetermined limits for any of these vehicle factors. If the limits are not exceeded, a pressure above the default braking pressure is applied. This process is successively conducted and the pressure is successively increased, based on the successive monitoring and calculating of values in comparison to the predetermined factor limits, until a vehicle deceleration rate of about 2 meters per second is achieved, if possible. Further pressure increases are terminated before the target deceleration rate is achieved if any limit is exceeded.

Very high pressure systems have been proposed for disk brake air systems. However, this technology cannot be operatively applied to present air brake circuits, and it is not yet approved by D.O.T.

In the past, dual pressure air brake systems have been proposed where a higher pressure (120 psi) is generated by an on-board air compressor and stored in a first tank to operate a spring air brake circuit. Air pressure at 120 psi is passed through a pressure reducing valve to be stored at a lower pressure (60 psi) to operate a service air brake circuit. This technology has no application to collision avoidance circuits.

As discussed above, existing collision avoidance systems that have been designed for hydraulic brake systems, are not applicable (transportable) to air brake systems as air brake system components and hydraulic brake system components differ remarkably. The hydraulic system technology is not transportable into air brake system technology. Moreover, existing collision avoidance systems have not been designed for aftermarket installation in older vehicles. Additionally, they have not been designed to operate with various third party warning or detection devices.

The National Highway Traffic Safety Administration (NHTSA) and the Insurance Institute for Highway Safety announced in March 2016, that by 2022, 99% of the new automobiles must have automatic emergency braking systems as a standard feature. Automatic emergency braking systems will similarly, also, soon be required for tractor trailers, and heavy straight trucks and buses.

The features of aftermarket installation and compatibility with existing third party warning and detection devices are important.

It is also important to be able to modify the existing air brake systems on tractor trailers, heavy straight trucks and buses, as these vehicles have long service lives, often extending beyond twenty years or more. These vehicle air brake systems should be able to be modified to meet the new NHTSA standards without replacing the entire air system.

It is desirable that the modifications to existing non-electronic air brake systems also be non-electronic, thereby eliminating or minimizing the need for sensitive electronic components.

It is further desirable that the modified system be able to operate with drive brake pedal air operation as originally installed.

It is also desirable that the system be able to operate with an automatic braking method responsive to an "impending" collision (critical) situation signal, and with an automatic braking method responsive to an "imminent" collision (more critical) situation signal (stage 3).

It is highly desirable that the modifications of the original air brake system, resident in the present invention, leaves the system pneumatically activated and controlled.

SUMMARY OF THE INVENTION

An automatic braking control system and method are provided for controlling the automatic operation of an air brake system on a commercial highway vehicle. The system permits the normal manual operation of the air brakes by the driver's brake pedal, under normal conditions. When a possible collision is detected, the system automatically operates the vehicle's air braking system to avoid or mitigate the collision. The automatic braking system is pneumatically operated and controlled.

The vehicle's factory installed air braking system, in a normal configuration, is employed to stop the vehicle, such as tractor trailer, a heavy straight truck, or a bus, under the foot-operated brake pedal control of the driver. A commercially available collision warning device is used to detect and calculate an impending collision and/or an imminent collision, whereby the "impending" collision is determined to occur within 1.4 seconds and the "imminent" collision is determined to occur within 0.9 seconds.

Where the impending collision automatic braking operation does not stop the vehicle, a second stage operation, i.e., automatic braking for an imminent collision is activated. It is anticipated that the second stage operation will either stop the vehicle or mitigate collision damage. Once the warning device determines a 1.6 second spacing, the collision situation is ended, the automatic activation control ceases, the excess air pressure is bled from the system, and control of the braking is returned entirely to the driver.

The commercial collision warning device constantly calculates "closure time", based upon the speed of the vehicle with collision avoidance, the foregoing (preceding) vehicle's speed, and the distance between them.

The collision warning device is available from such manufacturers as WABCO Holdings, Inc., and Delphi Automotive, Inc. It is a radar-operated, ranging and closure calculating device which is adjusted to generate both the impending collision signal and an imminent collision signal as conditions dictate.

The driver is always in control of the braking system and can deactivate the automatic braking function by stepping on the brake pedal or by operating the vehicle turn signals. The commercial collision warning system monitors for and reacts to a change of the driver's brake pedal position. It also monitors for and reacts to the operation of the vehicle turn signals.

The invention provides a modification to a standard air brake system structure, which enables additional automatic activation and control stages. This permits an after-market up-grade of the factory air brake system. For the air brake system on a tractor trailer, an actuation apparatus is connected to a commercial collision warning device having signal nodes mounted on the front of the vehicle. This actuation apparatus can be a commercially available, solenoid operated, double acting, two position, four way, valve pair. This element can be an Ingersoll Rand model A 312 SD solenoid operated valve which gets its power from a connection to the collision warning device.

The solenoid in the actuation apparatus element receives its power from the commercial collision warning device. When the commercial collision warning device detects a change in driver brake pedal position or the activation of the vehicle turn signals, it shuts-off power to the actuation apparatus and deactivates the automatic braking operation.

The connection between the collision warning device and the actuation apparatus is hard wired. This is the only non-pneumatic connection in the invention's actuation apparatus. The actuation apparatus has pneumatic control lines output therefrom. Air pressure is supplied to the actuation apparatus from an air reservoir at its existing pressure, i.e., at 120 psi.

A first pneumatic output from this actuation apparatus is connected to operate a delayed application air control connection element positioned in the air pressure line between the front brake control valve and the air control connection for the front brake actuators. A second pneumatic output from the actuation apparatus is connected to operate an immediate application control connection element positioned in the air pressure line between the rear brake control valve and a rear brake relay valve which leads to the rear brake actuators of a tractor and a trailer brake actuators, if a trailer is present.

Thus, the system uses high pressure air, at 120 psi, to control the state of certain valves which provide the service air pressure to operate the rear and front service brakes. In controlling the air pressure to the vehicle's service brakes, the loss of control of the vehicle's travel path during panic stopping is minimized. Air pressure is always first applied to the rear service brakes, before it is applied to the front service brakes. Air pressure is applied to the front brakes only after (when) a threshold pressure value has been achieved on the rear brakes. Moreover the service air pressure to the rear and front brakes is always controlled so that the rear pressure is always higher than the front pressure. The rear pressure is significantly higher than the front pressure. This assures that the rear brakes are always physically engage before the front brakes and the rear brake stopping force is greater than at the front brakes. This eliminates or minimizes the possibility of a jackknife, or side skidding of the rear of the vehicle.

The actuation apparatus, a dual operation solenoid valve pair receives air pressure from an air pressure reservoir to be selectively passed into the invention piping in response to signals from the collision warning device. The actuation apparatus is normally closed, and provides air pressure at a first output when an impending collision signal is present, and air pressure at second output when an imminent collision signal is present. Only one output of the actuation apparatus can be active at a time.

When an impending collision signal is received indicating a collision in approximately 1.4 seconds, the actuation apparatus component controls valves opening to pressurize the rear foundation brakes to 40 psi, with air from a rear air reservoir. When the air pressure at the rear brakes rises to 20 psi, other valves are controlled to pressurize the front brakes with air from a front air reservoir. This automatic operation stops or slows the vehicle with 40 psi on the rear brakes and 20 psi on the front brakes.

When an imminent collision signal is received indicating a collision in approximately 0.9 seconds, the activation component enables valves to open to pressurize the rear brakes to 120 psi with air from the rear air reservoir. When the air pressure at the rear brakes rises to 20 psi, the front brakes are pressurized with air from the front air reservoir. This automatic operation stops the vehicle with 120 psi on the rear brakes and 80 psi on the front brakes, unless restricted to a lower pressure by the brake system manufacturer. For example some air brake equipment can only tolerate lower pressures, such as 80 psi on the rear circuit and 60 psi on the front circuit.

By having this braking sequence of the rear service brakes and the front service brakes, the rear tires always want to stop faster than the front tires. This eliminates or minimizes the tendency to fishtail, jackknife or the vehicle rolling over.

The present invention provides a modification to a standard air brake system structure, which enables the additional automatic activation and control stages. In the presence of an impending collision signal (1.4 seconds closure) the activation component opens valves to pressurize the rear service brakes are pressurized to about 40 psi, with air from a rear air reservoir. When the air pressure at the rear brakes rises to about 20 psi, other valves are opened to pressurize the front brakes with air from a front air reservoir. This automatic operation stops or slows the vehicle with about 40 psi on the rear brakes and about 20 psi on the front brakes. In the presence of an imminent collision signal (0.9 seconds closure), the activation component enables valves to open to pressurize the rear brakes to about 120 psi with air from the rear air reservoir. When the air pressure at the rear brakes rises to about 20 psi, the front brakes are pressurized with air from the front air reservoir to about 20 psi. Thus, this automatic operation stops the vehicle with about 120 psi on the rear brakes and about 80 psi on the front brakes.

BRIEF DESCRIPTION OF THE DRAWINGS

The invention can be understood from a reading of the following description and the attached claims, in connection with the accompanying drawings, in which like numerals refer to like elements and in which:

DETAILED DESCRIPTION OF THE INVENTION

Figure 1:
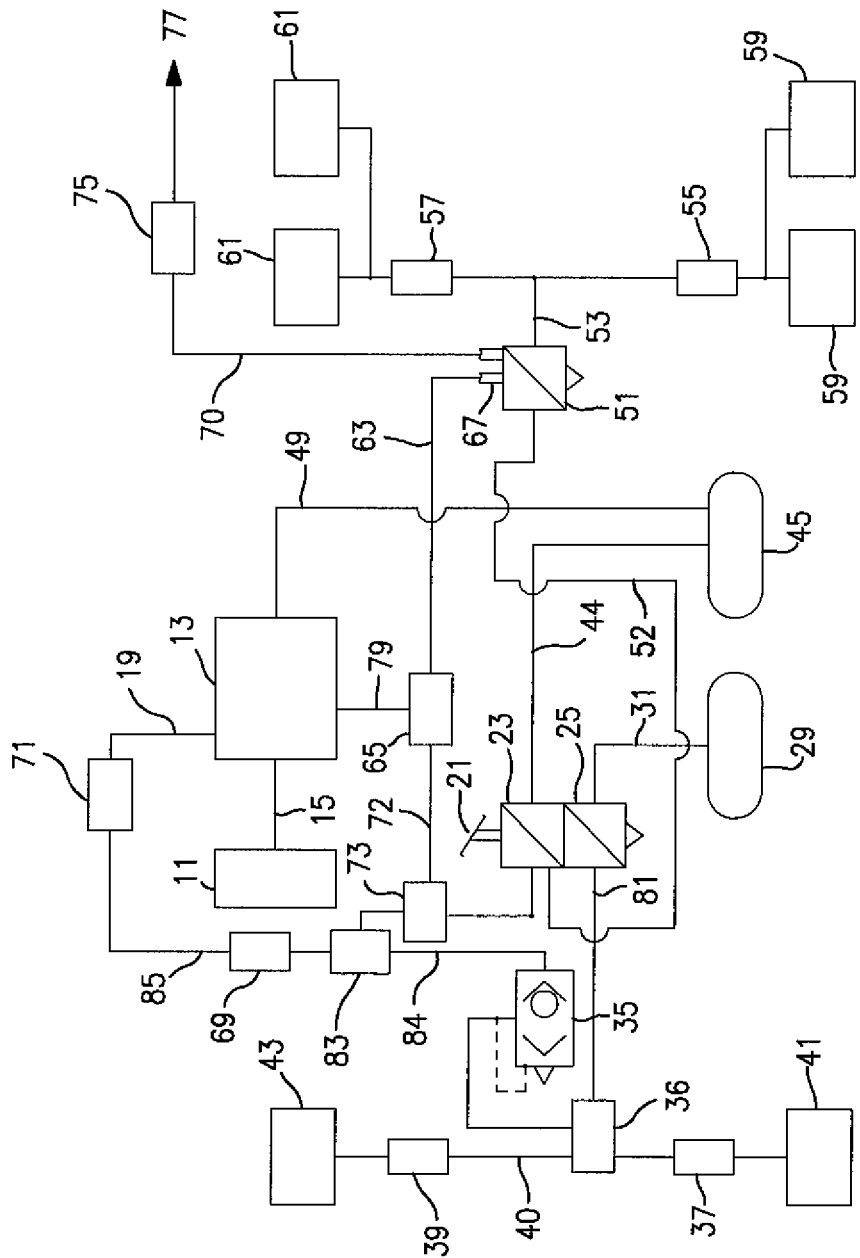
FIG. 1 is a block diagram for the invention system.

The present invention is a pneumatically operated and pneumatically controlled automatic braking control system and method for controlling air brakes on a commercial highway vehicle. The system operates in multiple stages. There is normal manual operation of the air brakes by the driver's brake pedal under normal conditions. When a possible collision is detected, the system automatically operates the vehicle's air braking system, by first applying air pressure to the rear brakes. When the pressure at the rear brakes has reached 20 psi, air pressure is applied to the front brakes. The air pressure applied on the rear brakes is ultimately 40 psi, and on the front brakes is ultimately 20 psi.

In a next stage, air pressure is also first applied to the rear brakes. When the rear brake pressure reaches 20 psi, air pressure is fed to the front brakes. In this stage, the air pressure on the rear brakes is ultimately 120 psi and on the front brakes is 80 psi. These pressures are reduced when required by the manufacturer's specifications.

The initial stage is activated when the vehicle is calculated to be approximately 1.4 seconds from impact. The next stage is activated when the vehicle is calculated to be approximately 0.9 seconds from impact.

FIG. 1 shows a block diagram of the structure of the invention. In a driver operated mode, a driver operated brake pedal 21 operates a rear brakes control valve 23 and a front brakes control valve 25, concurrently. The rear brake control valve 23 receives air pressure from a rear air reservoir 45 via a pneumatic line 44. The front brake control valve 25 receives air pressure from a front air reservoir 29 via a pneumatic line 31.

The output from the rear brake control valve 23 is connected to a rear service brake relay valve 51 via pneumatic line 52. Rear relay valve 51 then passes air pressure onto a left and a right rear ABS module 55, 57 via pneumatic line 53. The left and right rear ABS modules 55, 57 respectively feed left and right tandem brake actuators 59, 61.

The rear relay valve 51 via an additional pneumatic line 70 passes air pressure through a tractor protection valve 75 to a trailer service brake line 77, if a trailer is present.

The output from the front brake control valve 25 is connected to a front "T" connector gate 36 though a pneumatic line 81. Front connector gate 36 passes air pressure to a left and a right ABS module 37, 39 via a pneumatic line 40. Left and right ABS modules 37, 39 feed air pressure to left and right front brake actuators 41, 43, respectively.

A commercial warning device 11 is employed to detect collision conditions and to send signals indicating one or the other of two collision conditions, "impending" or "imminent". The output from the warning device 11 is three electrical wires 15, a "high" signal, a "low" signal and a ground. The low signal indicates an impending collision. The high signal indicates an imminent collision. No signal indicates a non-collision situation. Electrical connection cabling 15 powers (i.e., drives) an actuation apparatus 13, which actuator is an electronic, two stage, solenoid operated, air valve. The actuation apparatus 13 has two outputs. The first output is connected to a pneumatic line 19, while the second output is connected to a pneumatic line 79.

An "impending" collision (i.e., closure) indicates a collision in 1.4 seconds. An "imminent" collision indicates a collision (i.e., closure) indicates a collision in 0.90 seconds. A closure equal to or greater than 1.6 seconds is a non-collision condition.

The air pressure in the front air reservoir 29 is about 120 psi. The air pressure in the rear air reservoir is also kept at about 120 psi. Pneumatic line 49 feeds the 120 psi pressure to the actuation apparatus 13, which in turn feeds a one-way connector gate 71, via the pneumatic line 19. A pneumatic line 85 exits the one-way gate 71 and connects to a pressure regulator, step down gate 69. Regulator gate 69 can be adjustable. Regardless, it reduces the 120 psi from the actuation apparatus 11 to a pressure of 40 psi. The output of regulator gate 69 is connected to a connection "T" gate 83. An output line 84 from gate 83 is connected into a crack valve 35. The output of the crack valve 35 is connected into the front "T" connector gate 36 to ultimately lead to the front brake actuators 37, 39. The crack valve 35 operation may be adjustable. The crack valve 35 of the present invention is set to quickly release (open) at 20 psi.

Another pneumatic line from the "T" connection gate 83 is connected into a "T" connection gate 73. A pneumatic line from gate 73 connects to a connector "T" gate 65 via a pneumatic line 72. The gate 73 is also connected to an output from the rear brake control valve 23. The second output from the actuation device 13 via a pneumatic line 79 connects with the connector gate 65 which is connected to the input 67 of the rear relay valve 51 via a pneumatic line 63.

Air pressure is output from the actuation apparatus 13 via line 19 in an "impending" collision condition, i.e., where there is about 1.4 seconds of closure time until impact. In this situation there is no air pressure on line 79 from the other output actuator 13.

Air pressure is output from the actuation apparatus 13 via line 79 in an "imminent" collision condition, i.e., where there is about 0.9 seconds of closure time until impact. In this situation there is no air pressure on line 19 from the other output from actuator 13.

As an option, an electro-magnetic retarder device may be added, to be mounted to a rear axle or to the drive shaft to contribute additional braking action. Such retarders are frictionless stopping aids which are used to slow vehicles to prevent the service brakes from overheating and to minimize stopping distance. Retarders are commercially available from such manufacturers as Frenelsa S. A., Telma, S. A., Cama Products, Kimbo/Sharp Corporation and others.

When 1.4 seconds to impact is detected, the invention sends air pressure from rear reservoir 45 through the actuator 13, FIG. 1. Then via line 19 though gate 71, via line 85, through gate 69, though gate 83, and via line 84 to wait for crack valve 35.

Air pressure also flows though gate 83, through gate 73, via line 72 to gate 65, and there through. The air pressure travels via line 63 to input 67 and through rear relay valve 51 to the rear brakes. The other output from actuator 13 is closed.

When the pressure at the rear brakes relay valve 51 rises to 20 psi, there is also 20 psi at the crack valve 35. Crack valve 35 then opens and air pressure begins to build on the front brakes as it continues to increase on the rear brakes. The rear brake pressure is higher than the front brake pressure and remains so. The pressure is held with 40 psi on the rear brakes and 20 psi on the front brakes to stop the vehicle. When a trailer is present, trailer brake pressure will approximate the rear brake pressure at 40 psi.

When 0.9 seconds to impact is detected, the invention send air pressure from rear reservoir 45 through the actuator 13, and then via line 79 to the gate 65. The other output port from actuator 13 is closed.

The pressure at gate 65 is sent via line 63 to the rear relay valve 51 and via line 72 to gate 73. From gate 73 the pressure passes through the gate 83 and then via line 84 to the crack valve 35. When the pressure at the crack valve rises to 20 psi the crack valve opens and pressure begins to build on the front brakes, while continuing to rise on the rear brakes. The rear brake pressure is higher that the front brake pressure and remains so. A pressure of 120 psi is held on the rear brakes and 80-100 psi on the front brakes to stop or slow the vehicle. Again, when a trailer is present, the trail brake pressure will follow the rear brake pressure at 120 psi.

Figure 2:
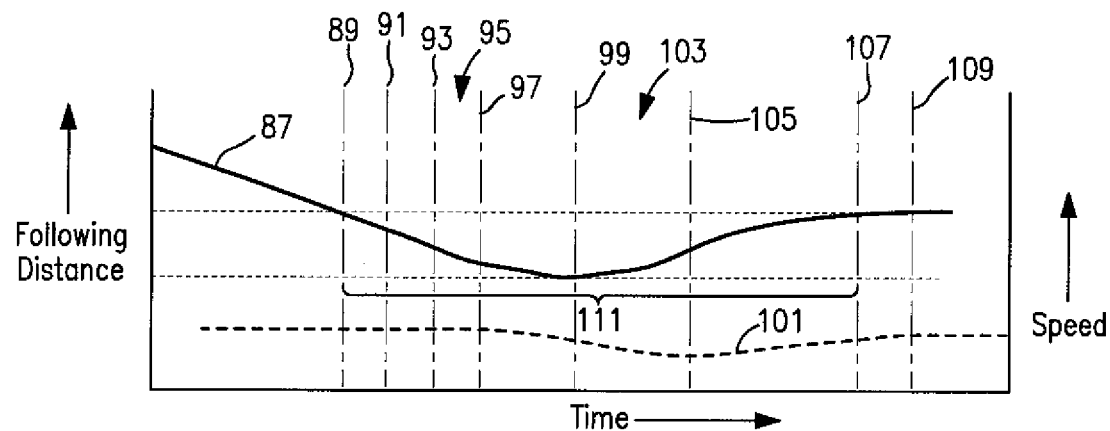
FIG. 2 shows the braking distance curve for an air brake system operating normally, with manual brake actuation from brake pedal operation.
Figure 3:
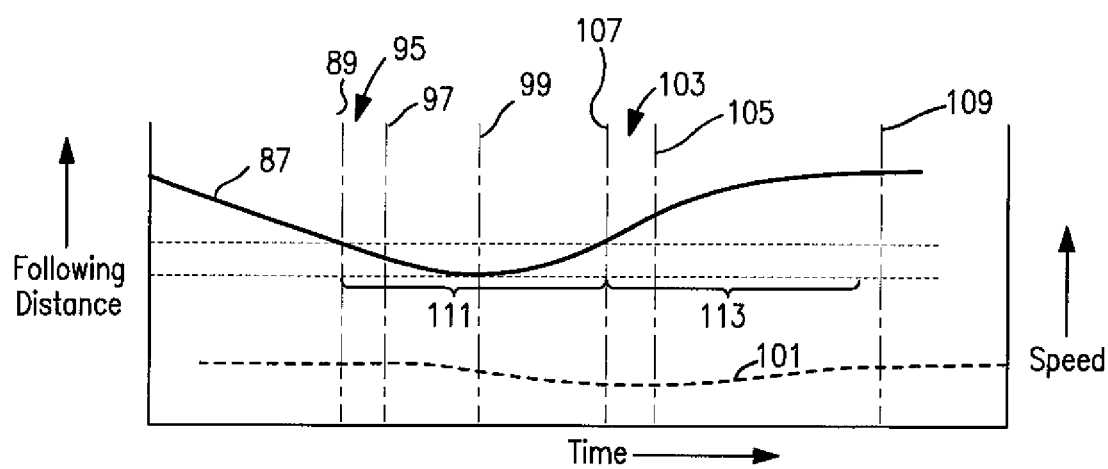
FIG. 3 shows the braking distance curve with automatic brake actuation of the present invention.

The operation of the invention, including following distance, response time and vehicle speed, is shown in FIG. 3, and can be compared with the same factors for the operation of a manual braking system, FIG. 2, and the same factors for the operation of the invention coupled with a commercial electro-magnetic retarder mounted to the vehicle drive shaft, or rear axle. These graphs were generated from test results obtained by operating the same test vehicle, which was first-operated with manual braking, then, secondly, with the collision avoidance braking invention in place, and lastly, with a drive shaft mounted retarder or rear axle mounted retarder added to the invention.

In each of these graphs (FIGS. 2, 3, 4) the solid line 87 shows vehicle following distance. Each of the graphs show a closure, i.e., a reduction in following distance of the test vehicle with respect to a preceding vehicle. For the manual system, FIG. 2, the response time, once a collision warning is generated, is shown as time of driver collision recognition 91, driver response 93, and brake response 95. For the present invention, FIG. 3, the response time once a warning is generated, is indicated by brake response 95 followed by brake deceleration 97. It is important to note that brake deceleration 97 is shown to occur much sooner in FIG. 4 than in FIG. 3.

The next important factor to note is the time of closest vehicle approach 99. This is the demarcation point, where the test vehicle braking action results in an increase in the distance to the foregoing vehicle, thereby avoiding a collision. This factor relates to the speed curve 101 of the braking vehicle which shows a reduction in speed 101, FIGS. 2, 3, 4, during braking. This speed reduction is seen to occur soonest in FIG. 4. The time to speed reduction is seen to be slightly less in FIG. 3. FIG. 2 shows the largest delay before a speed reduction occurs.

Once braking has occurred, the driver must make an evaluation 103. The driver controls the acceleration 105 of the vehicle 105 if conditions warrant. Once a safe distance is achieved 107, driver acceleration is ended 109.

With manual braking, FIG. 2, the warning duration 111 extends from the start of the warning signal 89 to the time a safe distance is achieved 107. With the invention, FIG. 3, the warning duration 111, is less, as it extends from the start of the warning signal 89 to the achievement of a safe distance 107 at the beginning of driver evaluation 103.

Figure 4:
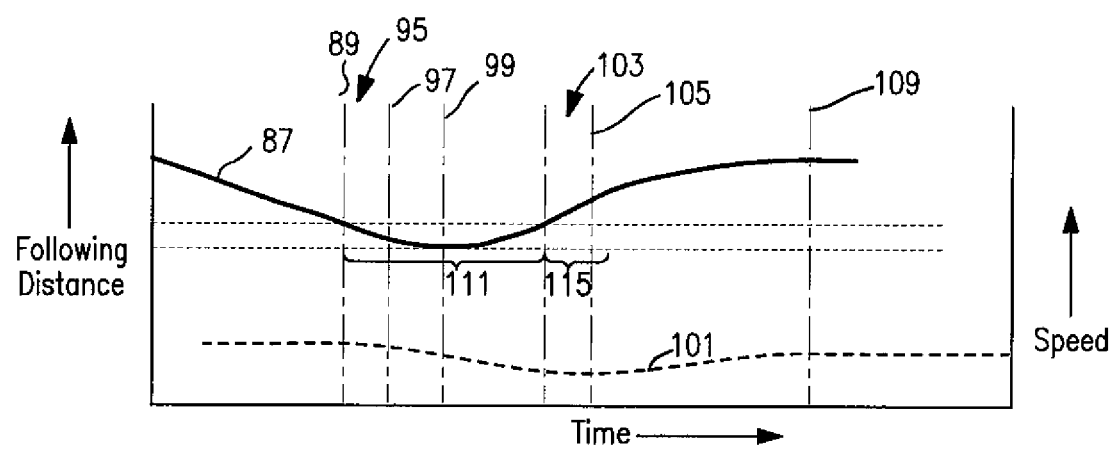
FIG. 4 shows the braking distance curve of the invention when coupled with an optional electromagnetic retarder on the drive shaft or on a rear axle.

With the addition of an electro-magnetic retarder, FIG. 4, warning duration 111 is further shortened and additional braking improvement 113 occurs. This improvement 113 is shown as the time from the achieved safe distance 107 time, to the time almost to the termination of driver controlled acceleration 109.

The following elements are shown in the accompanying drawings.

11 collision warning device
13 actuation apparatus—electronic, two stage, solenoid operated, air valve
15 electrical connection cabling—HLG (high low ground) cable wire
19 pneumatic line from actuation apparatus 13 to gate 71
21 driver brake pedal
23 rear brakes control valve
25 front brakes control valve
29 front air reservoir
31 pneumatic line from front air reservoir 29 to front brakes control valve 25
35 quick release crack valve
36 front "T" connector gate
37 left front ABS
39 right front ABS
40 pneumatic line from connector gate 36 to ABS 37 and 39
41 left front actuator
43 right front actuator
44 pneumatic line from rear air reservoir to rear brakes control valve 23
45 rear air reservoir
49 air supply connector
52 pneumatic line from rear brake control valve 23 to relay valve 51
51 service brake relay valve
53 pneumatic output to rear ABS 55 and 57

55 left rear ABS
57 right rear ABS
59 left rear brake actuator
61 right rear brake actuator
63 pneumatic feed from gate 65 to rear relay valve input 67
65 connector "T" gate
67 input for rear relay valve 51
69 pressure regulator step down gate 120 psi to 40 psi
70 pneumatic line from rear relay valve to tractor protection valve 75
71 one-way connector gate
72 pneumatic line from gate 73 to gate 65
73 pneumatic "T" connection gate between gate 83 and rear brakes control valve 23
75 tractor protection valve
77 trailer service brake line
79 pneumatic line from actuation apparatus 13 to connector gate 65
81 pneumatic line from front brake control valve 25 to front "T" connector gate 36, which connector gate also is connected to the output from crack valve 35
83 pneumatic connection "T" gate from pressure regulator 69
84 pneumatic line from gate 83 to crack valve 35
85 pneumatic line from one-way gate 71 to pressure regulator 69
87 solid line following distance
89 collision warning
91 driver recognition
93 driver response
95 brake response
97 brake deceleration
99 time of closest approach
101 speed curve
103 driver evaluation
105 driver acceleration
107 safe distance achieved
109 acceleration ended
111 warning duration
113 improvement in braking The foregoing description is intended to be illustrative of the invention. Modifications and substitutions may be introduced without departing from the scope or intent of the described invention or the accompanying claims.

What is claimed:

1. A method of automatic braking, collision avoidance for vehicle air brake systems in vehicles having a driver brake pedal and having vehicle turn signals, including the steps of:
    detecting an impending collision condition with a collision warning device;
    pressurizing a rear brake circuit with a source air pressure of about 40 psi when said impending collision condition is detected, wherein said pressurizing is actuated automatically by activating an automatic braking control system, said automatic braking control system comprising an actuation apparatus;
    pressurizing a front brake circuit when the air pressure at the rear brake circuit has risen about 20 psi, wherein said pressurizing is actuated automatically with said actuation apparatus; and
    maintaining an air pressure of about 40 psi at the rear brake circuit and about 20 psi at the front brake circuit with said actuation apparatus to slow or stop the vehicle; and
    wherein operating the vehicle turn signals deactivates the automatic braking control system.

2. The method of collision avoidance of claim 1, including the steps of:
    detecting an imminent collision condition;
    pressurizing the rear brake circuit with a source pressure of about 120 psi when said imminent collision condition is detected;
    begin pressurizing the front brake circuit when the pressure at the rear brakes has risen to about 20 psi; and
    maintaining an air pressure of about 120 psi at the rear brake circuit and about 80 psi at the front brake circuit to slow or stop the vehicle.

3. The method of collision avoidance of claim 1, including the steps of:
    detecting an imminent collision condition;
    pressurizing the rear brake circuit to a pressure of about 80 psi when said imminent collision condition is detected;
    begin pressurizing the front brake circuit when the pressure at the rear brake circuit has risen to about 20 psi; and
    maintaining an air pressure of about 80 psi at the rear brake circuit and about 60 psi at the front brake circuit to slow or stop the vehicle.

4. The method of collision avoidance of claim 1, including releasing the pressure on the rear brake circuit and the front brake circuit and returning brake operation entirely to the driver when a non-collision condition is detected.

5. The method of collision avoidance of claim 1, wherein said impending collision is determined to occur in about 1.4 seconds.

6. The method of collision avoidance of claim 2, wherein said imminent collision is determined to occur in about 0.9 seconds.

7. The method of collision avoidance of claim 4, wherein said non-collision condition is determined by a closure of greater than 1.6 seconds.

8. The method of collision avoidance of claim 1, including maintaining a front air pressure reservoir at 120 psi, and a rear air pressure reservoir at 120 psi, and pressurizing said rear brake circuit from said rear air pressure reservoir, and pressurizing said front brake circuit from said front air pressure reservoir; wherein pressing the driver brake pedal does not activate the automatic braking control system.

9. An automatic braking collision avoidance system for a commercial vehicle air brake system, said commercial vehicle air brake system having a front brake circuit, a rear brake circuit a driver brake pedal and vehicle turn signals, the system comprising:
    a collision warning device providing a signal representing closure time with a foregoing vehicle or object, including an impending collision warning signal and an imminent collision warning signal;
    a rear air pressure reservoir, and a front air pressure reservoir, where the pressure in each of said rear air pressure reservoir and said front air pressure reservoir is maintained at the same pressure;
    an automatic braking control system that comprises an actuation apparatus, said actuation apparatus being electrically connected to said collision warning device, wherein said automatic braking control system is activated in response to an impending collision warning signal or an imminent collision warning signal from said collision warning device;
    a rear brake control valve in a pneumatic pressure line between said rear air pressure reservoir and said rear brake circuit;

a front brake control valve in a pneumatic pressure line between said front air pressure reservoir and said front brake circuit;

wherein when an impending collision warning signal is detected, said actuation apparatus first controls air pressurization of said rear brake circuit with air from the rear air pressure reservoir such that when the air pressure at said rear brake circuit reaches a first threshold said actuation apparatus controls pressurization of said front brake circuit with air from the front air pressure reservoir to pressurize said front brake circuit;

wherein when the air pressure at said rear brake circuit and the air pressure at said front brake circuit each reach a predetermined target pressure, further pressure increases are ceased and each target pressure is maintained; and wherein operating the vehicle turn signals deactivates the automatic braking control system.

10. The automatic braking collision avoidance system of claim 9, wherein when an imminent collision warning signal is detected, said actuation apparatus first controls pressurization of said rear brake circuit to the target pressure with air pressure from said rear air reservoir, wherein when said air pressure at said rear brake circuit reaches a first threshold, said actuation apparatus then controls pressurization of said front brake circuit with air pressure from the front air pressure reservoir to a target pressure of less than said rear brake circuit target pressure, wherein when the air pressures at said rear brake circuit and said front brake circuit each reach the predetermined ultimate target pressures, further air pressure increases are ceased, and the ultimate target pressures are maintained.

11. The automatic braking collision avoidance system of claim 9, wherein the first threshold pressure at said rear brake circuit is about 20 psi, and wherein the predetermined target pressure at which said air pressure increases are ceased at about 40 psi for said rear brake circuit, and at about 20 psi for said front brake circuit.

12. The automatic braking collision avoidance system of claim 10, wherein said rear air pressure reservoir and said front air pressure reservoir are each at about 120 psi, and wherein the pressure threshold at the rear brake circuit for activating said pressurization of the front brake circuit is about 20 psi, and wherein the predetermined ultimate target pressure at said rear brake circuit is 120 psi and wherein the predetermined ultimate target pressure at said front brake circuit is about 80 psi.

13. The automatic braking collision avoidance system of claim 9 wherein operation of the rear brake control valve between said rear air pressure reservoir and said rear brake circuit is controlled with a high pressure pneumatic signal from said actuation apparatus, which pneumatic control signal passes through a gate that is pneumatically connected to rear brake control valve, the operation of said gate being controlled by a separate pneumatic control signal from said actuation apparatus.

14. The automatic braking collision avoidance system of claim 9 wherein said actuation apparatus comprises an electronic solenoid operated two position valve.

15. The method of claim 1, wherein said automatic braking control system comprises a collision warning device and an actuation apparatus, wherein said actuation apparatus comprises an electronic solenoid operated two position valve.

16. The automatic braking collision avoidance system of claim 9 further comprising an electro-magnetic retarder mounted to a rear axle or to a drive shaft of the vehicle.

17. A method of automatic braking and collision avoidance for vehicle air brake systems in vehicles having a driver brake pedal and having vehicle turn signals, including the steps of:

receiving a collision indication signal from a collision warning device, said collision indication signal activating an automatic braking control system that comprises an actuation apparatus;

pressurizing a rear brake circuit with air pressure from a rear air pressure reservoir to a threshold pressure value when said collision indication signal is detected, wherein pressurizing of said rear brake circuit is actuated automatically with said actuation apparatus; and pressurizing a front brake circuit with air pressure from a front air pressure reservoir when the air pressure at the rear brake circuit reaches said threshold value, wherein pressurizing of said front brake circuit is actuated automatically with said actuation apparatus; and wherein the rear brake circuit is continuously pressurized up to said maximum air pressure setting of said rear air pressure reservoir to slow or stop the vehicle, and wherein pressurization of the front brake circuit is stopped if the pressure on the rear brake circuit reaches said maximum air pressure setting, and wherein operating the vehicle turn signals deactivates the automatic braking control system.

* * * * *